United States Patent [19]

Dischert et al.

[11] Patent Number: 5,418,563
[45] Date of Patent: May 23, 1995

[54] DYNAMIC PEAKING APERTURE CORRECTION FOR USE WITH A CCD CAMERA

[75] Inventors: Lee R. Dischert, Medford, N.J.; Robert J. Topper, Hatboro, Pa.; Thomas J. Leacock, Mount Laurel; Joseph F. Hacke, Voorhees, both of N.J.

[73] Assignee: Panasonic Technologies, Inc., Secaucus, N.J.

[21] Appl. No.: 163,013

[22] Filed: Dec. 6, 1993

Related U.S. Application Data

[63] Continuation of Ser. No. 859,928, Mar. 30, 1992, abandoned.

[51] Int. Cl.⁶ .............................................. H04N 3/14
[52] U.S. Cl. ...................................... 348/241; 348/248
[58] Field of Search ............... 348/241, 248, 242, 322, 348/324

[56] References Cited

U.S. PATENT DOCUMENTS

| | | | |
|---|---|---|---|
| 4,220,971 | 9/1980 | Lambeth | 358/167 X |
| 4,317,134 | 2/1982 | Woo et al. | 358/213.23 X |
| 4,366,503 | 12/1982 | Terakawa et al. | 358/213.29 |
| 4,435,730 | 3/1984 | Bendell et al. | 348/250 |
| 4,503,547 | 3/1985 | Summers | 358/166 X |
| 4,608,606 | 8/1986 | Levine | 358/213.15 |
| 4,667,239 | 5/1987 | Dudley et al. | 358/166 |
| 4,695,890 | 9/1987 | Bouchavlat et al. | 358/213.18 X |
| 4,697,200 | 9/1987 | Miyatake | 377/62 |
| 4,700,229 | 10/1987 | Herrmann et al. | 358/167 X |
| 4,748,498 | 5/1988 | Yamanishi et al. | 358/167 X |
| 4,754,153 | 6/1988 | Hicks | 358/213.23 |
| 4,831,454 | 5/1989 | Tanaka et al. | 358/482 |
| 4,864,407 | 9/1989 | Mulder | 358/213.24 |
| 4,875,101 | 10/1989 | Endo et al. | 348/314 |
| 5,038,216 | 8/1991 | Easterly et al. | 348/364 |
| 5,038,388 | 8/1991 | Song | 382/54 |
| 5,053,615 | 10/1991 | Patel | 358/213.24 X |
| 5,144,434 | 9/1992 | Yamashita et al. | 358/166 |

FOREIGN PATENT DOCUMENTS 0283070 9/1988 European Pat. Off.
56-160069 12/1981 Japan.
2186146 8/1987 United Kingdom.

OTHER PUBLICATIONS

Chamberlain et al., "High Speed, Low Noise, Fine Resolution TDI CCD Imagers," SPIE vol. 1242, Charge Coupled Devices and Solid State Optical Sensors, 1990.

Ohbo et al., "A New Noise Suppression Method for High Definition CCD Cameras," IEEE Transactions on Consumer Electronics, Aug. 1989.

Price et al., "CCD-Kameras für professionelle Anwendungen", *Fernseh Und Kino Technik*, vol. 42, No. 9, pp. 423–428 (Sep. 1988).

H. J. Kaufman et al., "2-D Analog Filters for Real Time Video Signal Processing", *IEEE Transactions on Comsumer Electronics*, vol. 36, No. 2, pp. 137–141 (May 1990).

Primary Examiner—Michael T. Razavi
Assistant Examiner—Wendy R. Greening
Attorney, Agent, or Firm—Ratner & Prestia

[57] ABSTRACT

An apparatus is provided for processing the output signals of a charge transfer device having at least one row of photoelectric elements. The charge transfer device produces output signals with charge levels that are provided to a shift register having a plurality of elements. The successive charge levels from each photoelectric element are provided to respective shift register elements, and the charge levels are transferred within the shift register to a readout terminal. Some of the charge is retained by each element as the charge is transferred. The retained charge is added to the next charge transferred into the element. This adding of residual charges averages the charges transferred, producing undesirable noise. A sample and hold device removes sampling artifacts inherent in the signal provided by the CCD, to produce a signal representing successive image pixel values. A peaking filter emphasizes high frequency components relative to low frequency components, to compensate for low pass filtering effects which may occur in the CCD.

10 Claims, 6 Drawing Sheets

DYNAMIC PEAKING APERTURE CORRECTION FOR USE WITH A CCD CAMERA

This application is a continuation of application Ser. No. 07/859,528, filed Mar. 30, 1992, now abandoned.

BACKGROUND OF THE INVENTION

The present invention relates to the use of charge coupled devices (CCD's) for video signal collection, and more particularly to an apparatus and method for applying a correction to compensate for low-pass filtering effects which may occur in charge transfer devices.

Charge coupled devices (CCD's) are used commonly in video imaging. In the simplest form, a linear array of photosensors is used to form charge packets proportional to light intensity incident on each photosensor, and these packets are shifted to a detector point for readout. CCD's are used for dynamic storage and withdrawal of charge and may be modeled as a series of field effect transistors (FET's). When a gate pulse is applied to one of these FET's, nearby charge carriers in a p-type semiconductor underneath the gate are repelled, creating a depletion region in the semiconductor. This depletion region creates a potential well which is used to store charge.

In a typical CCD imaging array, multiple linear CCD imaging arrays are arranged in a matrix configuration such that the readout stage of each linear array is coupled to a respectively different stage of a CCD shift register, which operates at a relatively high clock rate. A line of charge packets, one packet from each linear imaging array, is simultaneously shifted into the respective stages of the CCD shift register. These charge packets are then shifted out of the shift register at relatively high speed. In this configuration, each charge packet corresponds to an image pixel and each line of packets loaded in parallel into the CCD shift register corresponds to the active video portion of a scanned line of a video image.

Typically, a CCD shift register (CCD SR) comprises a row or array of FET's. A means is provided to allow charge to flow from one potential well to an adjacent one quickly without loss of much charge. Voltages are applied to the FET's non-uniformly so that the potential wells vary with time and location within the CCD line or array. The voltages are clocked to cause the potential well to decrease in one FET at the same time it is increasing in the adjacent FET, causing the charge to shift. Charges can thus be applied, moved and collected.

One of the problems inherent in the charge transfer process is that some of the charge is retained by each cell as the charge packet transfers along the CCD SR. When a residual charge remains in a potential well, it is added to the next charge packet which is transferred into the well. This adding of residual charge averages the charges over as many wells as are transferred. In a CCD imaging device, the video signal for one picture element (pixel) will be averaged with the values in other pixels, causing the picture at the far end of the imaging matrix (i.e., away from the output stage of the CCD SR) to appear softened, or low-pass filtered.

Figure 1:
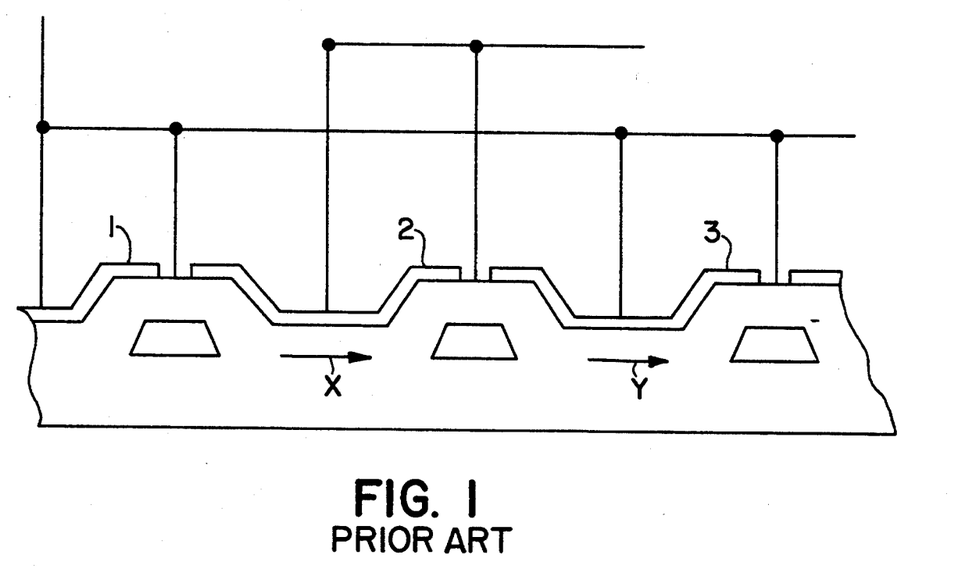
FIG. 1 labeled prior art shows a portion of a prior art CCD array.

FIG. 1 shows three adjacent elements from a conventional linear CCD SR in which residual charges occur. A line of charges is loaded into the CCD SR elements simultaneously, so there are no residual charges the beginning of the line. The second element 2 receives an input signal X, which is the charge transferred from the first element 1 to second element 2. Second element 2 provides an output signal Y which is the charge transferred to the third element 3. When a charge is transferred out of element 2, a fraction of the charge designated $\alpha$ is retained in element 2, and the remaining fraction $(1-\alpha)$ is transferred.

This incomplete transfer of charge makes the CCD element behave like a filter with feedback. At any given time i, the charge transferred by element 2 is equal to the sum of fraction of the input signal provided by element 1 which is transferred at time i, plus the fraction of the last prior charge in element 2 which was retained at time $i-1$. This is expressed in equation (1).

$$Y_i = \alpha Y_{i-1} + (1-\alpha) X_i \tag{1}$$

Equation (1) is a linear difference equation which defines a recursive sampled data filter, also known as an infinite impulse response filter. The element 2 behaves like a low pass filter with feedback. The infinite impulse response designation signifies that even when no charge is injected into an element, it will still have an output signal due to the feedback effect of the residual charge.

The inventors have determined that the value of $\alpha$ tends to increase as the time between charge transfers decreases. Thus, the picture softening problem is more acute for high speed devices, such as high definition television (HDTV) cameras, than for cameras used, for example, to produce NTSC images.

Figure 2:
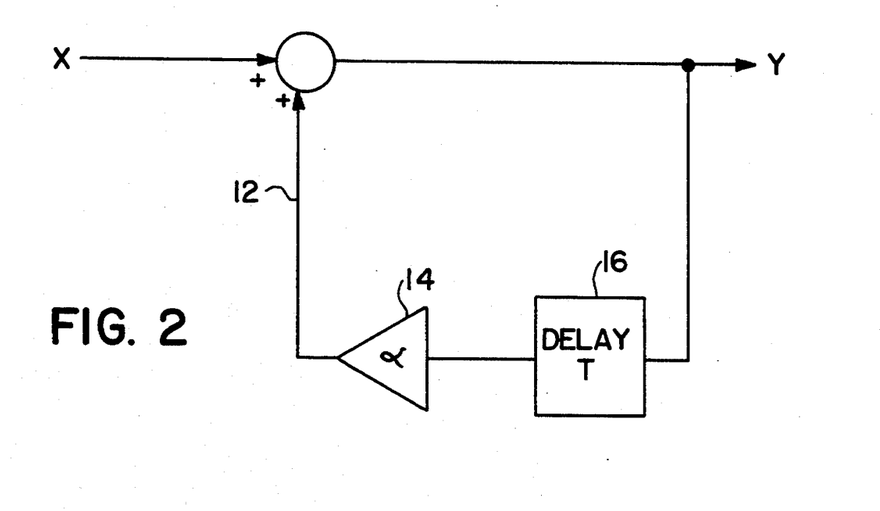
FIG. 2 shows a block diagram of the prior art device shown in FIG. 1.

FIG. 2 shows a block diagram of the behavior of a single CCD element. The value of input signal X is the charge stored in circuit 10. There is an effective feedback loop 12 with a gain 14 of $\alpha$ and a delay 16 of one sample period T.

Figure 3:
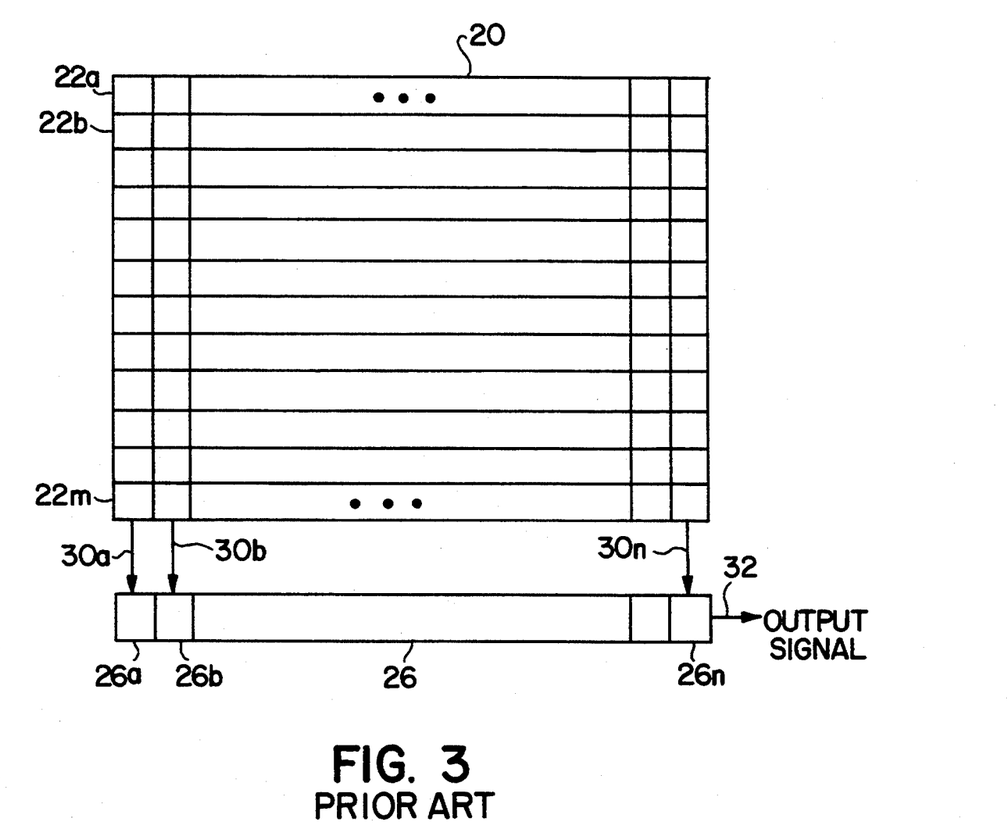
FIG. 3 labeled prior art shows a two dimensional prior art CCD array.
Figure 4A:
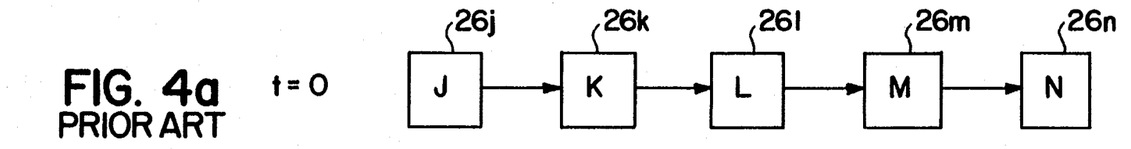
FIGS. 4a–e show the charges stored in the individual elements of the prior art CCD shown in FIG. 3.
Figure 4B:
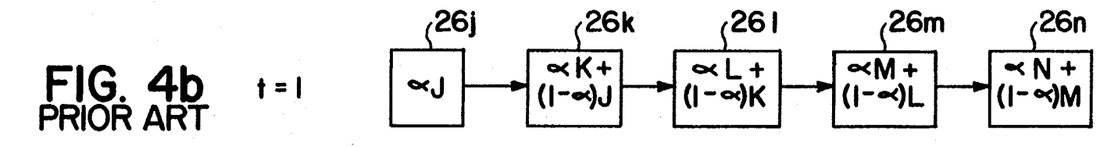
Figure 4C:
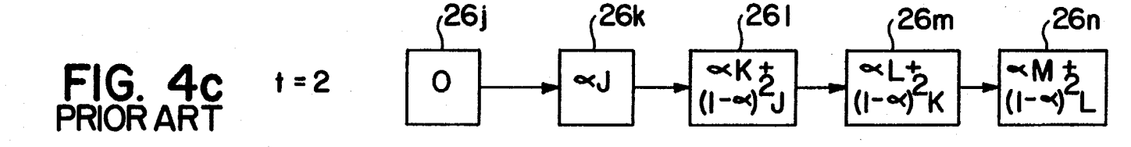
Figure 4D:
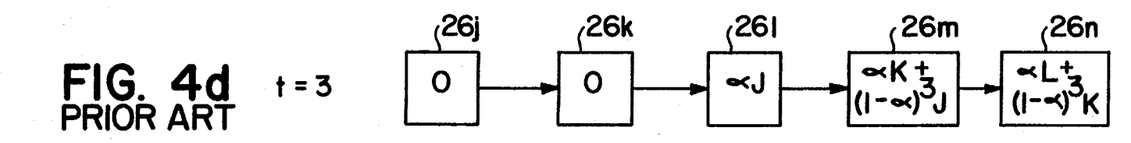
Figure 4E:
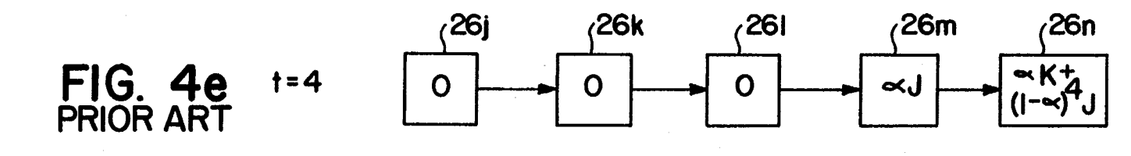

FIG. 3 shows a two dimensional CCD array 20. CCD array 20 comprises m rows 22$a$-$m$, each row having n charge transfer elements 24$a$-$n$ per row. Each charge transfer element 24 in the last row of the array 20 provides an output signal 30$a$-$m$ to a respectively different storage element 26$a$-$n$ of CCD shift register 26.

FIGS. 4$a$-$e$ show how the charges are initially injected into each element of shift register 26$a$-$n$ from the bottom CCD row 22$m$, and subsequently shifted to the right within shift register 26. In a conventional CCD system, the shift register elements 26$a$-$n$ have all transferred their charges before a new row of charges is injected into elements 26$a$-$n$ in parallel. As shown in FIG. 4$a$, the initial charges injected into shift register elements 26$a$-$n$, are (from right to left) N, M, L, K, J. As shown in FIG. 4$b$, after one period, all of the charges are shifted to the right. Because of the residual charge, the rightmost shift register element 26$n$ will have a charge equal to $\alpha N+(1-\alpha)M$. As shown in FIG. 4$c$, after the second period, element 26$n$ will have a charge equal to $\alpha^2 N+\alpha M+(1-\alpha)^2 L$. For brevity, the higher order terms ($\alpha^2$, $\alpha^3$, etc.) are omitted from FIGS. 4$c$-$e$. FIGS. 4$d$ and 4$e$ similarly show the charge in each element after 3 and 4 periods, respectively. After the $n^{th}$ period, the charge in element 26$n$ will be given by equation (2).

$$Y_n = \left(\sum_{i=0}^{n-1} \alpha^{n-i} W_n\right) + (1-\alpha)^n W_n \tag{2}$$

where
W = the original charge transferred from the CCD array

Y = the charge read out of the shift register

As n becomes larger (i.e., as the leftmost values are read from the shift register), more sample values are mixed in with the value being read. The result is that the error due to averaging is greater for the pixels which are read later (those originally on the left side of the array). This causes the picture to be softened (low pass filtered) more on the left side than on the right.

In Ohbo, M. et al., "A New Noise Suppression Method for High Definition CCD Cameras" a Reflected Delayed Signal (RDS) method for compensating for the low pass filter effect is discussed. Ohbo provides the modulated CCD output signal to a delay circuit. In the delay circuit, the output signal is delayed by half of the CCD output signal period and this delayed signal is then subtracted from the CCD output signal. This method is used to recover the CCD signal from the multiphase signal provided directly by the CCD. This signal may be analogized to a sampling signal modulated by the image data. This circuit substantially cancels low frequency noise in the CCD output signal. It does not, however, affect the frequency content of the baseband video signal which may be obtained from the CCD output signal using conventional sample-and-hold techniques.

U.S. Pat. No. 4,435,730 to Bendell et al. discusses an apparatus for improving CCD signal to noise characteristics. The apparatus processes two signals from a CCD, the reset drain and the floating diffusion signals. The drain has poor signal to noise characteristics at high frequencies, and the diffusion has poor signal to noise characteristics at low frequencies. The drain signal is filtered using a low pass filter (LPF), and the diffusion signal is filtered using a high pass filter (HPF). The LPF and HPF have complementary transfer characteristics. Their transient responses are opposite in phase, so that when the output of the LPF and HPF are combined, the transient characteristics cancel.

Chamberlain, *High Speed, Low Noise, Fine Resolution TDI CCD Imagers*, 1242 SPIE 252 (1990) discusses another method in which modifications to the CCD array are made. Time delay integration (TDI) is a technique in which a column of CCD elements are sequentially exposed to the object being imaged, such that the clock rate for shifting charges is synchronized with the velocity of the object. As the signal moves down the column, it grows. For a column with n TDI stages, (i.e., having n elements) the signal at the readout is n times the signal without TDI, but the noise is only increased by $n^{\frac{1}{2}}$.

CCD's with TDI architectures employ a buffer output video amplifier at the end of each CCD readout shift register. Chamberlain adds a two stage source follower amplifier. This amplifier is formed using special low doped source drain buried channel MOSFET devices. The goal of this technique is to further reduce the value of $a$, the residual charge fraction, and a value of $10^{-5}$ is quoted.

TDI techniques are not without cost, however. For an array of given size, the dynamic range of the imager decreases as the number of TDI stages increases.

SUMMARY OF THE INVENTION

In accordance with the present invention, an exemplary method is provided for correcting the low pass filtering effect observed in charge transfer devices. The device has at least one row of photoelectric elements and a shift register. The charge from each photoelectric element is provided to a respective shift register element. The charges are transferred within the shift register to a readout terminal.

At the readout terminal, the output signal of the charge transfer device is processed using a sampled data filter which compensates for the low pass filtering effects.

In a further exemplary apparatus in accordance with the present invention, the output signal at the readout terminal is passed through a high pass filter and the magnitude of the high-pass component of the filtered signal is adjusted using a variable multiplier device. The output signal from the multiplier is summed with the shift register readout value to provide a corrected signal.

DESCRIPTION OF THE PREFERRED EMBODIMENT

Figure 5:
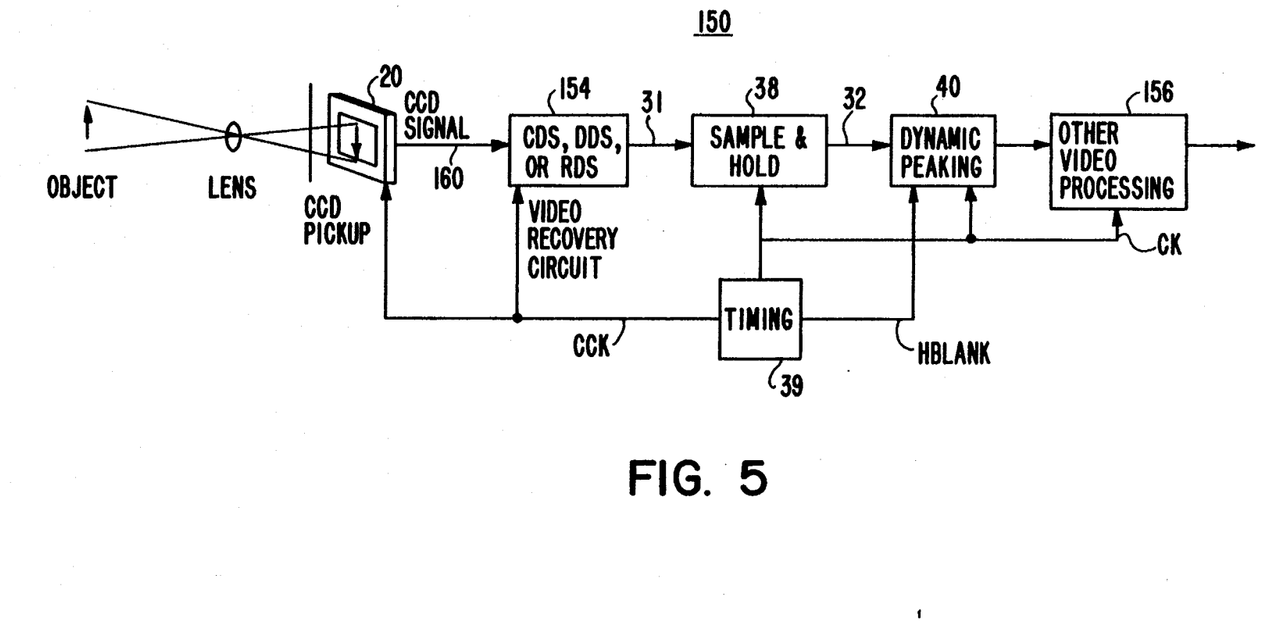
FIG. 5 shows a block diagram of an exemplary system in accordance with the present invention.

FIG. 5 shows a block diagram of an exemplary embodiment of the present invention. A camera processing system 150 is shown which may include a conventional CCD array 20, video recovery circuitry 154, timing circuitry 39 and other video processing circuitry 156 (e.g., gamma correction circuiting). These elements are known to practitioners in the field. CCD 20 provides an output signal 160. Video recovery circuitry 154 "demodulates" signal 160 to separate the baseband data signal 32 from the feedthrough signal. Video recovery circuitry 154, for example, conventional noise suppression techniques such as reflection delay suppression, correlated double sampling, or differential delay suppression. A sample and hold circuit 38 removes sampling artifacts inherent in the signal 31 provided by the CCD 20, and generates a signal 32 representing successive image pixel values. A dynamic peaking circuit 40, is provided to perform corrective filtering on the baseband video signal 32 before completing video signal processing.

The combination of the video recovery circuitry 154 and the sample and hold circuitry 38 is commonly referred to as the detection circuitry. It produces a baseband video signal from the output signal of the CCD 20 which has characteristics of an amplitude modulated radio frequency (RF) signal. This circuitry is provided as an example of detection circuitry. Alternatively, the sample-and-hold circuit 38 may be replaced by an analog to digital converter (ADC) (not shown) and the video recovery circuitry 154 may be modified to operate in the digital domain and be positioned after this ADC.

Figure 6:
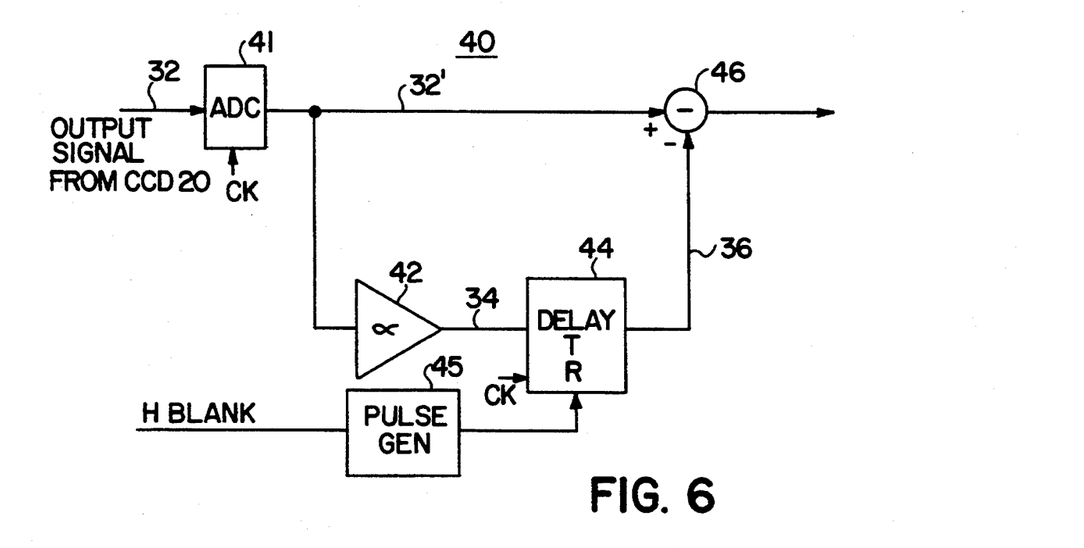
FIG. 6 shows a block diagram of the first exemplary embodiment of the invention.

FIG. 6 shows a block diagram of an exemplary embodiment of a dynamic peaking circuit 40 in accordance with a first embodiment of the invention. Baseband signal 32 exhibits the familiar low-pass-filtered characteristics which are corrected by the present invention.

Baseband CCD output signal 32 is provided to an analog to digital converter (ADC) 41 which produces digital samples that are applied to a multiplier 42. Multiplier 42 multiplies signal 32 by the constant $\alpha$. Multiplier 42 may be a conventional shift-and-add device which applies a constant gain to any input signal. Multiplier 42 could also be implemented as a read only memory (ROM) look-up table in which the input signal is the address and the values output are the input signal values multiplied by $\alpha$. The value $\alpha$ is the fraction of residual charge which is retained in CCD element 26n after a charge transfer. For a CCD of good quality, the value of $\alpha$ is small.

The output signal 34 from multiplier 42 is provided to a storage device 44. Storage device 44 stores the value of signal 34 for one cycle of the CCD, i.e., for the time period during which the charge in each element 26a to 26n−1 is shifted to its respective adjacent element 26b to 26n. The value 36 provided by storage device element 44 is then subtracted from the digitized CCD output signal 32' by a subtracter 46. It is understood by those skilled in the art of digital signal processing that the delay element 44 may be eliminated if the multiplier 42 can be configured to provide a delay of one sample period.

It is also understood by practitioners in the field that the functions in FIG. 6 may also be embodied in conventional analog components. For example, multiplier 42 may be a precision amplifier or a two-quadrant multiplier. The delay function performed by CCD storage device 44 or a conventional analog sample-and-hold circuit (not shown). Alternatively, the delay function may be performed by an analog delay line (not shown). For these embodiment, the ADC 41 would not be needed.

The corrective filter 40 discussed in this exemplary embodiment of the invention compensates for the residual charge left in register element 26n during the most recent previous sampling period. Since signal 36 includes higher order terms (residual fractions of residual charges left from 2 or more sampling periods earlier), filter 40 is able to correct for these second and higher order residual charges as well.

In operation, the residual charges are all zeroed prior to loading shift register elements 26a–n in parallel at the beginning of a line scan. In addition, the value held in the delay element 44 is zeroed at the beginning of each scan line so that no correction is applied to the first (rightmost) charge packet in the CCD 20. As shown in FIG. 6, this zeroing function is performed by a pulse generator 45 which generates a single pulse, having a duration of one clock period, at the start of the active video interval. This pulse signal is applied to a reset terminal R of the delay element 44. The pulse generator 45 is responsive to a horizontal blanking signal, HBLANK which is, for example, in a logic-high state during the horizontal blanking interval and in a logic-low state otherwise.

Figure 7:
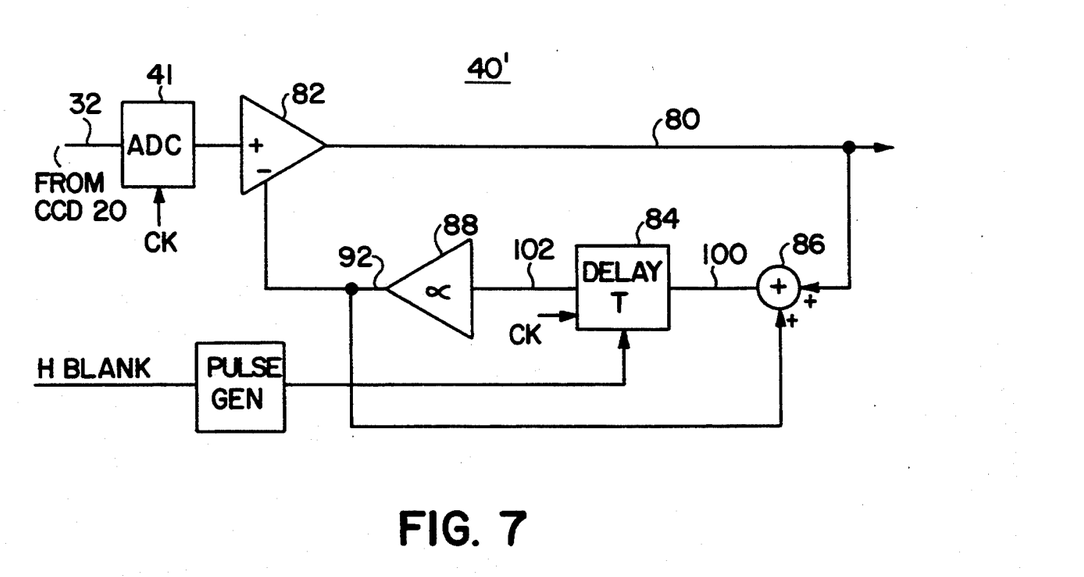
FIG. 7 shows an alternative exemplary embodiment of the invention.

FIG. 7 shows a block diagram of a second exemplary embodiment if the invention. The second embodiment has the same overall transfer characteristics as the first, but employs a different set of hardware components in filter 40'. In contrast to filter 40 in the first exemplary embodiment, filter 40' is an infinite impulse response (IIR) filter. Filter 40' provides its output signal 80 as an input signal to a second IIR filter 104. The second IIR filter 104 provides an output signal 92 which is used as a feedback signal that is subtracted from the input signal to the filter 40' to produce its output signal. Filter 40' is the first infinite impulse response filter means for processing the charge levels and for providing a corrected signal. Subtracter 82 provides means for subtracting the feedback signal 92 from the charge levels at the readout terminal and for generating a corrected output signal therefrom. Filter 104 provides a second infinite impulse response filter means for receiving the corrected signal 80 and for generating the feedback signal 92 therefrom. Filter 40 includes a feedback path (including adder summing circuit 86, delay 84, and multiplier 88); the feedback path receives the corrected signal 80 and provides a feedback signal 92.

The baseband signal 32 from CCD 20 is passed through corrective filter 40'. Correction signal 92 is subtracted from signal 32 by subtracter 82. The corrected signal 80 is provided to summing circuit 86, which also receives correction signal 92. Summing circuit 86 provides a signal 100 which is the sum of signal 80 and signal 92. Signal 100 is delayed by one sampling period in delay element 84. The output signal 102 from delay element 84 is provided to multiplier 88, which multiplies it by $\alpha$, the residual charge fraction. Multiplier 88 provides the result as the correction signal 92. The delay element 84 is reset at the start of each line of samples by the pulse signal provided by the pulse generator 45, as described above with reference to FIG. 6.

As in the first embodiment of the invention, an apparatus in accordance with the second embodiment may be constructed using either digital or analog components to perform the functions of the delay element 84, the multiplier 88, the adder 86 and the subtracter 82. An analog implementation would include a precision amplifier or a two-quadrant multiplier for the multiplier 88, a summing network for the adder 86 and a differential amplifier, biased for unity gain for the subtracter 82. An analog implementation would also include a sample-and-hold circuit (not shown), an analog delay line (not shown) or a single-stage CCD delay (not shown) for the delay element 84.

Although the second exemplary embodiment employs more hardware components than the first exemplary embodiment, it may provide an improvement in quantization errors, since additional bits are used in computing the correction signal value.

Figure 8:
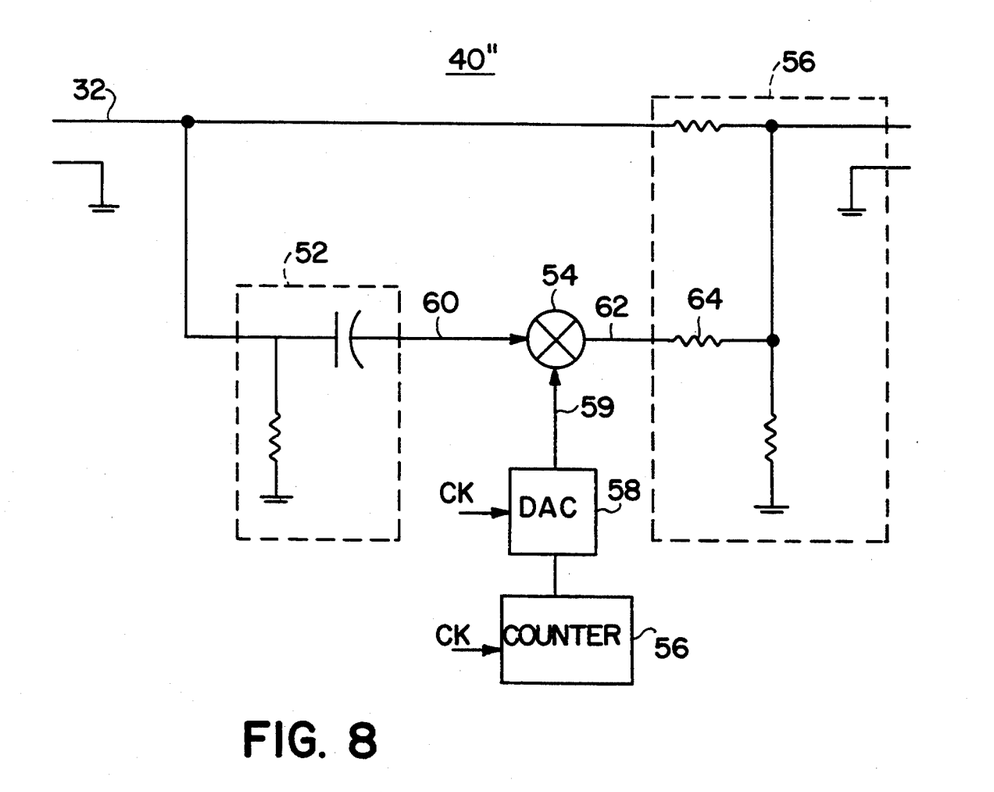
FIG. 8 shows a further exemplary embodiment of the invention.

FIG. 8 shows a block diagram of a third exemplary embodiment of the invention, in which a variable gain is provided within the correction circuit 40'' to approximate higher order low-pass filter compensation. This embodiment performs variable peaking based on the number of shifts or transfers that a signal incurs before readout.

In this embodiment, the baseband signal 32 from the CCD 20 is fed into a high pass filter 52 and a two quadrant multiplier 54. The high pass filter 52 can be a simple RC circuit. The high pass filtered signal 60 is multiplied by a factor provided in gain signal 59. Signal 59 is zeroed when the charge levels are transferred to the readout stage shift register elements in parallel. The value of signal 59 then increases by one step for each successive charge serially transferred to the readout terminal of the shift register 26. This stepped signal 59 may be provided by passing the output of a digital counter 56 through a digital-to-analog converter (DAC) 58. The correction signal 62 is added to the uncorrected signal 32 in summing circuit 56. In this exemplary embodiment, each step represents a factor of α.

This embodiment of the invention provides a correction signal which approximates the results achieved in the first and second embodiment using inexpensive analog components. Further savings may be achieved by a variation of this technique in which the gain applied to the correction signal does not vary with every pixel read from the CCD. Instead, an average gain factor is used for a group of several charge levels, and the factor varies between groups. For example, one gain factor may be used for the correction applied to the first hundred charge levels serially transferred to the readout terminal, then a second factor may be used for the next hundred, and so on. To provide a variable gain by this method, counter 56, DAC 58 and multiplier 54 are not required. Instead, resistor 64 in the summing circuit 56 may be replaced with a plurality of switched resistors 64a-n (not shown). For each group of charge levels, a different resistor 64a-n would be switched into the circuit to provide the desired gain.

Alternatively, the counter 56 and DAC 58 may be replaced by an analog ramp generator (not shown) which produces a continuous ramp function that models the step function produced by the counter 56 and DAC 58.

It is understood by one skilled in the art that many variations of the embodiments described herein are contemplated. While the invention has been described in terms of exemplary embodiments, it is contemplated that it may be practiced as outlined above with modifications within the spirit and scope of the appended claims.

We claim:

1. Charge transfer apparatus, comprising:
    a charge transfer device having a plurality of elements and a readout terminal, wherein a plurality of successive charge levels are provided to respective shift register elements in parallel, and said charge levels are serially transferred within the shift register to a readout terminal, and wherein a substantial fraction of the charge level held in each of the register elements remains in the element after the charge level is serially transferred, the fraction of the charge being added to a next successive charge level stored in the element;
    detector means, coupled to said readout terminal, for removing sampling artifacts from the signal provided thereby to provide a baseband signal; and
    means, coupled to said detector means, for emphasizing high frequency components of the baseband signal relative to low frequency components, to substantially attenuate distortion resulting from the fraction of each charge level remaining in the respective shift register elements after transferring the respective charges.

2. Charge transfer apparatus, comprising:
    a charge transfer device having a plurality of elements and a readout terminal, wherein a plurality of successive charge levels are provided to respective shift register elements in parallel, and said charge levels are serially transferred within the shift register to a readout terminal to provide an output signal, and wherein a substantial fraction of the charge level held in each of the register elements remains in the element after the charge level is serially transferred, the fraction of the charge being added to a next successive charge level stored in the element;
    detector means, coupled to receive the output signal, for removing sampling artifacts from the signal provided thereby to provide a baseband signal;
    means for providing a first signal having the same characteristics as the baseband output signal;
    means for adjusting the first signal in magnitude by a factor substantially equal to the fraction of the charge level held in each register element after transfer, to form an adjusted signal, the factor being independent of a magnitude of the baseband output signal;
    means for delaying the adjusted signal to provide a delayed adjusted signal having the same characteristics as the adjusted signal; and
    means for subtracting the delayed adjusted signal from the baseband output signal at the readout terminal of the shift register, whereby distortion resulting from the fraction of each charge level remaining in the respective shift register elements after transferring the respective charges is substantially attenuated.

3. The invention set forth in claim 2 wherein said means for providing a delayed adjusted signal is a digital delay element and said means for adjusting the magnitude of the first signal is a digital multiplier.

4. The invention set forth in claim 2 wherein said means for providing a delayed adjusted signal is a digital delay element and said means for adjusting the magnitude of the first signal is a read only memory look up table.

5. The invention set forth in claim 2 wherein said means for providing a delayed adjusted signal is an analog sample-and-hold circuit and said means for adjusting the magnitude of the first signal is a precision amplifier.

6. Charge transfer apparatus, comprising:
    a charge transfer device having a plurality of elements and a readout terminal, wherein a plurality of successive charge levels are provided to respective shift register elements in parallel, and said charge levels are serially transferred within the shift register to a readout terminal, forming an output signal thereat, and wherein a substantial fraction of the charge level held in each of the register elements remains in the element after the charge level is serially transferred, the fraction of the charge being added to a next successive charge level stored in the element, thereby adding a low frequency component to the output signal at the readout terminal;
    detector means, coupled to receive the output signal, for removing sampling artifacts from the signal provided thereby to provide a baseband signal;
    high pass filter means for processing the baseband signal to emphasize high frequency components relative to the low frequency component that results from the respective fractional portions of the respective charge levels remaining in the elements, to provide a filtered signal;
    variable multiplier means for adjusting the filtered signal in magnitude, to provide an adjusted filtered signal, the variable multiplier means having a gain that varies according to a number of shift operations which have been performed on a charge currently being read at the readout terminal since the charge currently being read was loaded into the shift register;

and means for adding the adjusted filtered signal to the baseband signal, to provide a corrected signal.

7. The invention set forth in claim 6, wherein the variable multiplier means adjusts the magnitude of the filtered signal by a factor whose value is zeroed when the charge levels are provided to respective shift register elements in parallel, and whose value increases by a constant step each time a successive charge is serially transferred to the readout terminal.

8. The invention set forth in claim 6, wherein successive charges are assigned to a plurality of groups, and the variable multiplier means adjusts the magnitude of the filtered signal by a factor whose value is zeroed when the charge levels are provided to respective shift register elements in parallel, and whose value increases each time a group of charges is serially transferred to the readout terminal.

9. Charge transfer apparatus, comprising:

a charge transfer device having a plurality of elements and a readout terminal, wherein a plurality of successive charge levels are provided to respective shift register elements in parallel, and said charge levels are serially transferred within the shift register to a readout terminal to provide an output signal, and wherein a substantial fraction of the charge level held in each of the register elements remains in the element after the charge level is serially transferred;

subtracting means for subtracting a first feedback signal from the output signal provided at the readout terminal of the shift register, thereby providing a corrected signal;

adding means for adding the first feedback signal to the corrected signal, thereby providing a second feedback signal;

means for providing a delayed signal having the same characteristics as the second feedback signal, the delayed signal being delayed relative to the output signal at the readout terminal by a period of time in which a charge is transferred within the shift register;

means for adjusting the delayed signal in magnitude by a factor substantially equal to the fraction of the charge level held in each register element after transfer to form said first feedback signal, thereby compensating for distortion resulting from the fractional portion of the charge levels remaining in each element after transferring a respective charge.

10. Charge transfer apparatus, comprising:

a charge transfer device having a plurality of elements and a readout terminal, wherein a plurality of successive charge levels are provided to respective shift register elements in parallel, and said charge levels are serially transferred within the shift register to a readout terminal, wherein a fraction of the charge level held in each of the register elements remains in the element after the charge level is serially transferred;

first infinite impulse response filter means for processing the charge levels and for providing a corrected signal, the first infinite impulse response filter means including means for subtracting a feedback signal from the charge levels at the readout terminal and for generating the corrected signal therefrom; and second infinite impulse response filter means for receiving the corrected signal and for generating the feedback signal therefrom, whereby the first and second infinite impulse response filter means compensate for distortion resulting from the fractional portion of the charge levels remaining in each element after transferring a respective charge.

* * * * *